US012275918B2

(12) United States Patent
Li et al.

(10) Patent No.: US 12,275,918 B2
(45) Date of Patent: Apr. 15, 2025

(54) CLEANING COMPOSITIONS FOR CLEANING HARD SURFACES

(71) Applicant: SHANGHAI JAHWA UNITED CO., LTD., Shanghai (CN)

(72) Inventors: Rong Li, Shanghai (CN); Jing Hong, Shanghai (CN); Zhitao Chen, Shanghai (CN)

(73) Assignee: SHANGHAI JAHWA UNITED CO., LTD., Shanghai (CN)

( * ) Notice: Subject to any disclaimer, the term of this patent is extended or adjusted under 35 U.S.C. 154(b) by 945 days.

(21) Appl. No.: 17/311,091

(22) PCT Filed: Nov. 15, 2019

(86) PCT No.: PCT/CN2019/118743

§ 371 (c)(1),
(2) Date: Jun. 4, 2021

(87) PCT Pub. No.: WO2020/119381

PCT Pub. Date: Jun. 18, 2020

(65) Prior Publication Data

US 2022/0041958 A1 Feb. 10, 2022

(30) Foreign Application Priority Data

Dec. 10, 2018 (CN) ......................... 201811503302.5

(51) Int. Cl.

*C11D 3/20* (2006.01)
*B08B 3/04* (2006.01)
*C11D 1/74* (2006.01)
*C11D 3/382* (2006.01)
*C11D 3/43* (2006.01)
*C11D 11/00* (2006.01)

(52) U.S. Cl.

CPC .............. *C11D 1/74* (2013.01); *C11D 3/2065* (2013.01); *C11D 3/382* (2013.01); *C11D 3/43* (2013.01); *C11D 2111/20* (2024.01)

(58) Field of Classification Search

CPC ....... C11D 1/667; C11D 3/2065; C11D 3/382; C11D 11/00; C11D 11/0023; B08B 3/04

See application file for complete search history.

(56) References Cited

U.S. PATENT DOCUMENTS

| | | | | |
|---|---|---|---|---|
| 4,158,644 A | | 6/1979 | Hammerel | |
| 5,891,835 A | * | 4/1999 | Vlasblom | A61K 8/39 510/438 |
| 5,998,355 A | | 12/1999 | Brumbaugh | |
| 10,640,730 B2 | | 5/2020 | Abe et al. | |
| 2005/0143267 A1 | * | 6/2005 | Piterski | C11D 3/0089 510/124 |

FOREIGN PATENT DOCUMENTS

| | | | | |
|---|---|---|---|---|
| CN | 1207760 A | | 2/1999 | |
| CN | 101186864 A | | 5/2008 | |
| CN | 101330899 A | | 12/2008 | |
| CN | 102389378 A | | 3/2012 | |
| CN | 103113997 A | | 5/2013 | |
| CN | 105400600 A | | 3/2016 | |
| CN | 105769618 A | | 7/2016 | |
| CN | 106551819 A | | 4/2017 | |
| CN | 106860051 A | | 6/2017 | |
| CN | 108368451 A | | 8/2018 | |
| EP | 0679715 A1 | | 11/1995 | |
| JP | 2002201487 A | | 7/2002 | |
| WO | 2013119908 A1 | | 8/2013 | |
| WO | WO 2013/119908 | * | 8/2013 | A61K 8/00 |
| WO | WO 2014/168424 | * | 10/2014 | C11D 9/06 |
| WO | WO-2014168424 A1 | * | 10/2014 | A61K 8/0241 |

OTHER PUBLICATIONS

International Search Report issued Feb. 19, 2020 in International Appln No. PCT/CN2019/118743.
Extended European Search Report dated Aug. 4, 2022 in corresponding European Patent Application No. 19897241.6.
Chinese Office Action dated Mar. 4, 2022 in corresponding Chinese Patent Application No. 201811503302.5.

* cited by examiner

*Primary Examiner* — Brian P Mruk
(74) *Attorney, Agent, or Firm* — MEDLER FERRO WOODHOUSE & MILLS

(57) ABSTRACT

The disclosure provides a cleaning composition for cleaning a hard surface, comprising: a) an oil and/or fat, wherein the oil and/or fat is from 1% to 20% by weight based on a total weight of the composition; b) a polyol; c) a surfactant, wherein a weight ratio of the surfactant to the oil and/or fat is equal to or greater than 1:5. The disclosure further relates to a method of preparing the cleaning composition and uses thereof.

6 Claims, No Drawings

CLEANING COMPOSITIONS FOR CLEANING HARD SURFACES

TECHNICAL FIELD

The present disclosure pertains to the field of hard surface cleaning, particularly to the field of hard surface cleaning for infant dinnerware, milk bottles, nipples, food processing facilities, food/drink transport facilities, child care facilities, etc. In particular, the present disclosure relates to a cleaning composition comprising an oil and/or fat, a surfactant, a polyol, and optional water, and a method of preparing the same.

BACKGROUND ART

If dinnerware, particularly infant dinnerware for feeding supplementary food, milk bottles, nipples and the like, are not washed clean in time, residual grease and protein will provide the best nutrition to bacteria for their multiplication, and the risk of possible attack of a variety of diseases will rise. As people's living standard is continually improved and their health consciousness is continually strengthened, dinnerware detergents become indispensable daily necessities in their life. Most of the commercially available dinnerware detergents comprise anionic surfactants in a high content as the main component compounded with non-ionic or amphoteric surfactants. However, when the commodities of existing brands in the market are surveyed generally, they are not necessarily satisfactory from a viewpoint of their performances which will be detailed as follows.

Cleansing power: The varieties of dinnerware are increasingly plentiful along with the improvement of people's living standard. In addition to ceramic and glass dinnerware, the proportion of plastic dinnerware represented by PP and PPSU dinnerware increases year by year. The properties of low interface tension and rough, porous surface of this type of dinnerware lead to stronger bonding between the dinnerware and greasy dirt. However, conventional formulations for washing dinnerware are not designed particularly for such materials. Hence, we often feel in daily life that plastic dinnerware washed with such formulations seem to still have a layer of oil on their surface when they are touched by hand, or give out a smell of spoiled oil.

Irritating property: Despite their strong ability to remove grease, conventional anionic surfactants such as LAS, AES, K12 and the like irritate skin to a certain degree. Long-term use of this kind of dinnerware detergents tends to make hand skin dry, and even damage skin to some extent.

Environmental friendliness and safety: In recent years, domestic media have reported several events about harmful substances such as phenyl rings, dioxane and the like contained in household detergents. These harmful ingredients mainly come from the surfactants and their derivatives that are commonly seen in such dinnerware detergents as LAS, AES, AEO-9, etc. In order to achieve ideal detergency, manufacturers often add excessive surfactants, such that organic residues that are difficult to be degraded still exit after washing. On the other hand, repeated washing to remove the organic residues is not only a waste of water resource, but also very undesirable for environment and human health.

With the rapid development of technology, a dazzling number of dinnerwares are available in the market. Particularly, infant dinnerware for feeding supplementary food, milk bottles and the like are mostly made from plastic materials such as PPSU. Breast milk and formula milk are rich in nutrients. Particularly, the milk contains a lot of fats and proteins, so it is prone to getting bad when exposed to air. Proteins are especially favorable for multiplication of pathogenic bacteria. If not cleaned in time, they tend to cause symptoms such as infant diarrhea and the like, so that babies' health will be affected. On the other hand, the intestinal tracts of infants have not developed fully, so more attention should be paid to the safety of the detergents for infant dinnerware, milk bottles and the like to such an extent that the detergents are mild and leave no residues. Unfortunately, most of the detergents for infant dinnerware in the current market make direct use of the detergent formulae for adult dinnerware. Some formulae are alleged to utilize mild, green glycoside or polyglyceride surfactants. However, such surfactants are generally not added in a high content due to the problem of cost. As a result, an ideal cleaning effect cannot be achieved. Accumulated residues still tend to spoil, and thus affect the quality of the milk made from milk powder. This is extremely inconvenient for the users.

To solve the above problems, the present disclosure provides a cleaning composition for hard surface, which is particularly designed for targeted materials. The cleaning composition exhibits high stability, superior performance in cleansing power, ability to reduce or eliminate possibility of bacteria growth, as well as safety, non-toxicity, mildness and non-irritation.

SUMMARY

In an aspect, the present disclosure provides a cleaning composition for cleaning a hard surface, comprising:

a) an oil and/or fat, wherein the oil and/or fat is from 1% to 20% by weight based on a total weight of the composition;

b) a polyol;

c) a surfactant selected from the group consisting of sucrose esters, polyglycerides, polysorbates and combinations thereof, wherein a weight ratio of the surfactant to the oil and/or fat is equal to or greater than 1:5.

In a preferred embodiment, the surfactant in the cleaning composition of the present disclosure is selected from the group consisting of polyglycerol monolaurates, sucrose laurates, Tweens and combinations thereof.

In a preferred embodiment, the surfactant in the cleaning composition of the present disclosure is used in an amount of 0.5-5 wt % based on the total weight of the composition.

In a preferred embodiment, the cleaning composition of the present disclosure further comprises water. In a more preferred embodiment, the water in the cleaning composition of the present disclosure is equal to or less than 5 wt % based on the total weight of the composition.

In a preferred embodiment, the polyol in the cleaning composition of the present disclosure is glycerol.

In a preferred embodiment, the present disclosure provides a cleaning composition, comprising:

a) an oil and/or fat in an amount of 5-10 wt % based on a total weight of the composition;

b) glycerol;

c) a surfactant in an amount of 1-5 wt % based on the total weight of the composition;

d) water in an amount of 0-2 wt % based on the total weight of the composition.

In another aspect, the present disclosure further relates to a method of preparing a cleaning composition, comprising:

a) mixing a surfactant with a polyol to form a first phase;

b) preparing a second phase comprising an oil and/or fat;

c) adding the second phase obtained in step b) to the first phase obtained in step a) to form the cleaning composition.

In still another aspect, the present disclosure further relates to a use of the cleaning composition of the present disclosure for cleaning a hard surface.

In a preferred embodiment, the cleaning composition is applied to a hard surface having a surface energy of less than 72.2 $mJ/m^2$, preferably in the range of 12.4-61 $mJ/m^2$.

In a preferred embodiment, the hard surface for which the cleaning composition of the present disclosure is useful includes a surface of a food processing facility, a food/drink transport facility, a child care facility, an infant dinnerware, a milk bottle, or a nipple.

DETAILED DESCRIPTION

Unless otherwise defined, all the scientific and technical terms used herein have the same meanings as commonly understood by a person of ordinary skill in the art to which the present disclosure pertains. Preferred methods and materials will be described herein, although any methods and materials similar or equivalent to those described herein can be used to carry out or test the inventions in the present disclosure. The following terms are defined for the purpose of the present disclosure.

As used herein, the term "about" means that the difference of quantity, level, value, dimension, size or amount from those of a reference may be up to 30%, 20% or 10%. As used herein, all percentages are based on weight, unless otherwise specified.

Unless otherwise required, the term "comprise" and its variations "comprising" and "comprised of" throughout the description and claims should be appreciated to include all said entities or steps, or a group of entities or steps, but not excluding any other entities or steps or any other group of entities or steps.

For the first time, there is prepared a cleaning composition suitable for cleaning hard surfaces according to the present disclosure, particularly useful for hard surfaces of infant dinnerware, milk bottles, nipples, food processing facilities, food/drink transport facilities, child care facilities, etc. We have developed a cleaning composition comprising an oil and/or fat, a surfactant, a polyol and optional water.

First of all, all of the ingredients selected in the present disclosure can be used in food, and can also be found in GB2760-2014 "STANDARD FOR USE OF FOOD ADDITIVES" and INVENTORY OF EXISTING COSMETIC INGREDIENTS 2015.

According to the present disclosure, any oil and/or fat comprising a saturated fatty acid can be used in the preparation of the cleaning composition. For example, sources of oils and/or fats include plants and chemical synthesis processes. In some preferred embodiments, the oils and/or fats useful in the cleaning composition are oils and/or fats originated from plants. In some more preferred embodiments, the oil and/or fat useful in the cleaning composition is selected from olive oil, avocado oil, rice bran oil, sunflower seed oil and combinations thereof.

The oils and/or fats useful in the cleaning composition of the present disclosure are particularly suitable for cleaning hard surfaces (especially those of infant dinnerware, milk bottles, nipples, food processing facilities, food/drink transport facilities, child care facilities, etc). For example, as infant commodities are concerned, those made of plastic materials such as PP, PPSU and the like are generally used. In view of the low surface tension property of plastics, an amount of an oil and/or fat may be added to facilitate removal of greasy dirt from pores and surfaces of the plastics according to the principle of "like dissolves like", and then a mild surfactant may be used to reduce the surface tension between the dirt and the interface, so as to clear the dirt. Therefore, as compared with conventional detergents, the cleaning composition of the present disclosure is particularly suitable for cleaning plastic articles.

Moreover, in light of the peculiar characteristic of breast milk and formula milk power that the main oil/fat ingredients are saturated fatty acids, the cleaning composition will be more suitable for clearing milk stain if an oil and/or fat having a high content of a saturated fatty acid is selected.

In addition, due to the diet habit, the oils/fats in the dietary structure of Chinese consumers are mainly vegetable oils, while less animal oils/fats are employed. Hence, vegetable oil ingredients in the formula may be more effective in removing greasy dirt left on dinnerware in daily life.

The polyol useful in the cleaning composition of the present disclosure may be glycerol. Glycerol is a well-known moisturizing ingredient that is commonly used. It has not only a cleaning effect, but also a function of hand care.

The surfactants useful in the cleaning composition of the present disclosure are mild, non-irritating surfactants. In a preferred embodiment, the surfactant in the cleaning composition of the present disclosure is selected from the group consisting of sucrose esters, polyglycerides, and combinations thereof. In a preferred embodiment, the surfactant in the cleaning composition of the present disclosure is selected from the group consisting of polyglycerol monolaurates, sucrose laurates, Tweens and combinations thereof.

In some embodiments, the cleaning composition of the present disclosure further comprises water. In some specific embodiments, the water in the cleaning composition of the present disclosure is not more than 10 wt %. In a preferred embodiment, the cleaning composition of the present disclosure comprises equal to or less than 5 wt % of water. In a preferred embodiment, the cleaning composition of the present disclosure comprises equal to or less than 4 wt % of water. In a preferred embodiment, the cleaning composition of the present disclosure comprises equal to or less than 3 wt % of water. In a preferred embodiment, the cleaning composition of the present disclosure comprises equal to or less than 2 wt % of water. The inventors have discovered that addition of a small amount of water to the cleaning composition can make the formulation clearer in appearance, and thus more attractive to consumers.

Just for the reason that the materials used in the cleaning composition of the present disclosure can ensure safety, non-toxicity and low irritation of the ingredients, the cleaning composition is particularly suitable for infants whose intestinal tracts have not developed fully and who have higher requirement of safety.

With a balance between the residual amount and the cleansing power of the composition prepared according to the present disclosure taken into consideration, no excessive surfactant or oil/fat is added to the formula on condition that an ideal cleansing power is achieved. As shown by the results of cleansing power testing, in comparison with water and a competitive product (Pigeon detergent for milk bottles), the cleaning composition of the present disclosure has a lower chemical oxygen demand (COD) value, indicating a lower residual amount (a total amount of milk stain+detergent). In other words, the product of the present disclosure has a stronger cleansing power.

In some embodiments according to the present disclosure, the cleaning composition comprises 1-20 wt % of an oil and/or fat, based on the total weight of the composition. In a preferred embodiment, the cleaning composition of the present disclosure comprises 2-15 wt % of an oil and/or fat. In a more preferred embodiment, the cleaning composition of the present disclosure comprises 5-10 wt % of an oil and/or fat.

In some embodiments according to the present disclosure, the cleaning composition comprises 0.5-5 wt % of a surfactant, based on the total weight of the composition. In a preferred embodiment, the cleaning composition of the present disclosure comprises 1-5 wt % of a surfactant. In a more preferred embodiment, the cleaning composition of the present disclosure comprises 1.25-2.5 wt % of a surfactant.

In some embodiments according to the present disclosure, the surfactant and the oil and/or fat in the cleaning composition have a weight ratio of equal to or greater than 1:5. In a specific embodiment, the surfactant and the oil and/or fat in the cleaning composition have a weight ratio of 1:2.

In another aspect, the present disclosure further provides a method of preparing a cleaning composition for cleaning a hard surface (e.g. a surface of infant dinnerware, milk bottle, nipple, etc), wherein the method comprises the following steps: a) mixing a surfactant with a polyol to form a first phase; b) preparing a second phase comprising an oil and/or fat; c) adding the second phase obtained in step b) to the first phase obtained in step a) to form the cleaning composition.

In a preferred embodiment, the step a) is carried out at a temperature in the range of 75-80° C. In a preferred embodiment, the step b) is carried out at a temperature in the range of 75-80° C. In a preferred embodiment, the step c) is carried out under continuous agitation. In a preferred embodiment, the process of preparing the final cleaning composition comprises a step of homogenization at 4000 rpm.

In still another aspect, the present disclosure further provides a use of the cleaning composition of the present disclosure for cleaning a hard surface. In a preferred embodiment, the hard surface for which the cleaning composition of the present disclosure is useful includes a surface of a food processing facility, a food/drink transport facility, a child care facility, an infant dinnerware, a milk bottle, a nipple, or the like.

Generally, depending on the difference of the surface tension (also known as surface energy) between a solid and a liquid, the liquid can be easily spread on a solid interface if the surface tension of the liquid<the surface tension of the solid; conversely, if the surface tension of the liquid>the surface tension of the solid, discrete liquid drops will form on the surface of the solid, i.e. the solid is in a non-wetted state. Hence, it's not easy for water (having a surface energy of 72.2 mJ/m$^2$) to spread on common plastics (whose surface energy is lower than that of water). As such, for plastic materials, the cleansing ability of a detergent is cut down. The surface energies of common plastic materials are as follows: 19.1 mJ/m$^2$ for polytetrafluoroethylene (PTFE); 32.4 mJ/m$^2$ for polyethylene (PE); 33 mJ/m$^2$ for polypropylene (PP); 40.2 mJ/m$^2$ for polymethyl methacrylate (PMMA); 40.6 mJ/m$^2$ for polystyrene (PS); 41.4 mJ/m$^2$ for polyamide (PA); 45.1 mJ/m$^2$ for polyethylene glycol terephthalate (PET); 41.5 mJ/m$^2$ for polyvinyl chloride (PVC); 61 mJ/m$^2$ for urea resin. The cleaning composition of the present disclosure is suitable for cleaning a hard surface having a surface energy of less than 72.2 mJ/m$^2$, preferably in the range of 12.4-61 mJ/m$^2$. In a preferred embodiment according to the present disclosure, the cleaning composition is suitable for a hard surface having a surface energy of 15-50 mJ/m$^2$. In a more preferred embodiment, the cleaning composition is suitable for a hard surface having a surface energy of 20-45 mJ/m$^2$.

EXAMPLES

Now, the technical solutions of the present disclosure will be illustrated in detail with reference to the following preferred embodiments. However, the scope of the present disclosure is not limited to these embodiments which are intended to demonstrate the technical solutions of the present disclosure without limiting the scope of the present disclosure. The test methods in the following examples for which no specific conditions are indicated will be carried out generally under conventional conditions or under those conditions suggested by the manufacturers. Unless otherwise specified, all parts are parts by weight, and all percentages are percentages by weight.

The ingredients used in the Examples of the present disclosure and the corresponding manufacturers are shown in Table A.

TABLE A

| Name of Ingredient | Ingredient Supplier | INCI | Note |
|---|---|---|---|
| Sucrose laurate CHEMICAL CO., Japan | MITSUBISH | Sucrose Laurate | Food additive |
| Polyglycerol monolaurate | NIKKO Kasei Co. | Polyglyceryl-10 laurate | Food additive |
| Tween 20 | Croda Chemicals Co., Ltd | Polysorbate 20 | Food additive |
| Glycerol (medical grade) | Wilmar Oleochemicals Co., Ltd | Glycerin | Food additive |
| Refined olive oil | Textron Technology Co., Ltd, Spain | Olea Europaea Fruit Oil | Edible oil |
| Avocado oil | HENRY LAMOTTE GMBH | Persea Gratissima oil | Edible oil |
| Rice bran oil | Lipotec Chemicals Inc. | Oryza Sativa(Rice) Bran Oil | Edible oil |
| Deionized water | Self-made | | |

Examples 1-5: Preparation of Cleaning Compositions

Based on the mass parts listed in Table 1, polyglycerol monolaurate was mixed with glycerol and heated to 75-80° C. to form phase A; and the refined olive oil was weighed and heated to 75-80° C. to form phase B. Phase B was added slowly into phase A and homogenized at 4000 rpm. After 5 minutes, the mixture was cooled naturally. When the temperature decreased to 60-65° C., deionized water was added, and the mixture was homogenized at 4000 rpm again. After 5 minutes, the mixture was cooled to room temperature. The product was taken out for later use.

TABLE 1

| | Name of | Example | | | | |
|---|---|---|---|---|---|---|
| Phase | Ingredient | 1 | 2 | 3 | 4 | 5 |
| A | Polyglycerol monolaurate | 1.25 | 1.25 | 1.25 | 2.5 | 2.5 |
| | Glycerol | 94.75 | 86.75 | 91.75 | 90.5 | 85.5 |
| B | Refined olive oil | 2 | 10 | 5 | 5 | 10 |
| C | Deionized water | 2 | 2 | 2 | 2 | 2 |
| | Total | To 100 | | | | |

Note:
The amounts of the various substances in Table 1 are mass percentages.

Test 1: Survey on Stability

Thermal aging test: The samples were placed in a thermostat for heat resisting test (40° C. or 48° C. for three months), a thermostat for cold resisting test (−18° C. for one month, or 4° C. for three months), and a thermostat for cold/heat cycling test (−18° C. to 40° C. for 10 cycles, 24 hours per cycle) to see whether the materials had any change in state (e.g., stratification, water bleeding, inhomogeneity, etc). In the case of no change at a temperature, the result was indicated with ○; otherwise, the result was indicated with A.

Centrifugal test: The samples were centrifuged at 2000 rpm for 30 min to see whether stratification occurred, and other indicators for the evaluation included changes in color, fragrance, appearance, transparency, etc. In the case of no change before and after centrifugation, the result was indicated with ○; otherwise, the result was indicated with A.

The results are shown in Table 2.

TABLE 2

| | Heat Resisting Test | | Cold Resisting Test | | Cold-heat Cycling Test −18° C. | Centrifugal |
|---|---|---|---|---|---|---|
| Example | 40° C. | 48° C. | −18° C. | 4° C. | to 40° C. | Test |
| 1 | ○ | ○ | ○ | ○ | ○ | ○ |
| 2 | Δ | Δ | Δ | Δ | Δ | Δ |
| 3 | ○ | ○ | ○ | ○ | ○ | ○ |
| 4 | ○ | ○ | ○ | ○ | ○ | ○ |
| 5 | ○ | ○ | ○ | ○ | ○ | ○ |

As seen from the above table, when the amount of the refined olive oil exceeds 10%, more than 1.25% of polyglycerol monolaurate is needed to emulsify the oil. If the amount of the refined olive oil exceeds 20%, the cost will be too high, and excessive oil will be introduced into the detergent. In view of this, cleaning compositions comprising higher amounts of oil are not further explored.

Examples 6-10: Preparation of Cleaning Compositions

Based on the mass parts listed in Table 3, sucrose laurate or polyglycerol monolaurate was mixed with glycerol and heated to 75-80° C. to form phase A; and the refined olive oil was weighed and heated to 75-80° C. to form phase B. Phase B was added slowly into phase A and homogenized at 4000 rpm. After 5 minutes, the mixture was cooled naturally. When the temperature decreased to 60-65° C., deionized water was added, and the mixture was homogenized at 4000 rpm again. After 5 minutes, the mixture was cooled to room temperature. The product was taken out for later use.

TABLE 3

| | Name of | Example | | | | |
|---|---|---|---|---|---|---|
| Phase | Ingredient | 6 | 7 | 8 | 9 | 10 |
| A | Sucrose laurate | 1.25 | 1.25 | — | — | — |
| | Polyglycerol monolaurate | — | — | 2.5 | 2.5 | 2.5 |
| | Glycerol | 86.75 | 88.75 | 90.5 | 82.5 | 72.5 |
| B | Refined olive oil | 10 | 10 | 5 | 5 | 5 |
| C | Deionized water | 2 | — | 2 | 10 | 20 |
| | Total | To 100 | | | | |

Note:
The amounts of the various substances in Table 3 are mass percentages.

Test 2: Survey on Stability

Thermal aging test: Samples were placed in a thermostat for heat resisting test (40° C. or 48° C. for three months), a thermostat for cold resisting test (−18° C. for one month, or 4° C. for three months), and a thermostat for cold/heat cycling test (−18° C. to 40° C. for 10 cycles, 24 hours per cycle) to see whether the materials had any change in state (e.g., stratification, water bleeding, inhomogeneity, etc). In the case of no change at a temperature, the result was indicated with ○; otherwise, the result was indicated with Δ.

Centrifugal test: The samples were centrifuged at 2000 rpm for 30 min to see whether stratification occurred, and other indicators for the evaluation included changes in color, fragrance, appearance, transparency, etc. In the case of no change before and after centrifugation, the result was indicated with ○; otherwise, the result was indicated with Δ.

The results are shown in Table 4.

TABLE 4

| | Heat Resisting Test | | Cold Resisting Test | | Cold-heat Cycling Test −18° C. | Centrifugal |
|---|---|---|---|---|---|---|
| Example | 40° C. | 48° C. | −18° C. | 4° C. | to 40° C. | Test |
| 6 | ○ | ○ | ○ | ○ | ○ | ○ |
| 7 | ○ | ○ | ○ | ○ | ○ | ○ |
| 8 | ○ | ○ | ○ | ○ | ○ | ○ |
| 9 | Δ | Δ | Δ | Δ | Δ | Δ |
| 10 | Δ | Δ | Δ | Δ | Δ | Δ |

As seen from the results, Examples 6 and 7 both endured the heat resisting test, the cold resisting test and the cold-heat cycling test. In addition, Example 6 looked clearer than Example 7. Hence, addition of a small amount of water can make a formulation look clearer.

However, Example 9 with 10% water added and Example 10 with 20% water added were turbid as compared with the systems of the Examples with only 2% water added, and stratified, indicating poor stability. Hence, it's not appropriate to add 10% or more water into the system.

Examples 11-14: Preparation of Cleaning Compositions

Based on the mass parts listed in Table 5, polyglycerol monolaurate was mixed with glycerol, or polyglycerol monolaurate and caprylic/capric triglyceride were mixed with glycerol, and heated to 75-80° C. to form phase A; and the refined olive oil, or avocado oil, or rice bran oil or sunflower seed oil was weighed and heated to 75-80° C. to form phase B. Phase B was added slowly into phase A and homogenized at 4000 rpm. After 5 minutes, the mixture was cooled naturally. When the temperature decreased to 60-65° C., deionized water was added, and the mixture was homogenized at 4000 rpm again. After 5 minutes, the mixture was cooled to room temperature. The product was taken out for later use.

TABLE 5

| Phase | Name of Ingredient | Example 11 | 12 | 13 | 14 |
|---|---|---|---|---|---|
| A | Polyglycerol monolaurate | 2.5 | 2.5 | 2.5 | 2.5 |
| | Glycerol | 85.5 | 85.5 | 85.5 | 85.5 |
| | Caprylic/capric triglyceride | | | | 10 |
| B | Refined olive oil | | 5 | | |
| | Avocado oil | 10 | | | |
| | Rice bran oil | | 5 | | |
| | Sunflower seed oil | | | 10 | |
| C | Deionized water | 2 | 2 | 2 | 2 |
| | Total | To 100 | | | |

Note:
The amounts of the various substances in Table 5 are mass percentages.

Test 3: Survey on Stability

Thermal aging test: Samples were placed in a thermostat for heat resisting test (40° C. or 48° C. for three months), a thermostat for cold resisting test (−18° C. for one month, or 4° C. for three months), and a thermostat for cold/heat cycling test (−18° C. to 40° C. for 10 cycles, 24 hours per cycle) to see whether the materials had any change in state (e.g., stratification, water bleeding, inhomogeneity, etc). In the case of no change at a temperature, the result was indicated with ○; otherwise, the result was indicated with Δ.

Centrifugal test: The samples were centrifuged at 2000 rpm for 30 min to see whether stratification occurred, and other indicators for the evaluation included changes in color, fragrance, appearance, transparency, etc. In the case of no change before and after centrifugation, the result was indicated with ○; otherwise, the result was indicated with Δ.

The results are shown in Table 6.

TABLE 6

| Example | Heat Resisting Test 40° C. | 48° C. | Cold Resisting Test −18° C. | 4° C. | Cold-heat Cycling Test −18° C. to 40° C. | Centrifugal Test |
|---|---|---|---|---|---|---|
| 11 | ○ | ○ | ○ | ○ | ○ | ○ |
| 12 | ○ | ○ | ○ | ○ | ○ | ○ |
| 13 | ○ | ○ | ○ | ○ | ○ | ○ |
| 14 | ○ | ○ | ○ | ○ | ○ | ○ |

As shown by the results, the system of the present disclosure is not limited by olive oil, but applicable to various vegetable oils/fats and synthetic oils/fats. The formulations were stable.

Examples 15-21: Preparation of Cleaning Compositions

Based on the mass parts listed in Table 7, 10-1-CC (chemical name: polyglyceryl-10-caprylate/caprate) and polyglyceryl-3 stearate were mixed with glycerol, or 10-1-CC, polyglyceryl-3 stearate and glycerol monostearate were mixed with glycerol, or 10-1-CC was mixed with glycerol, or Tween 20 was mixed with glycerol, and heated to 75-80° C. to form phase A; and the refined olive oil was weighed and heated to 75-80° C. to form phase B. Phase B was added slowly into phase A and homogenized at 4000 rpm. After 5 minutes, the mixture was cooled naturally. When the temperature decreased to 60-65° C., deionized water was added, and the mixture was homogenized at 4000 rpm again. After 5 minutes, the mixture was cooled to room temperature. The product was taken out for later use.

TABLE 7

| Phase | Name of Ingredient | Example 15 | 16 | 17 | 18 | 19 | 20 | 21 |
|---|---|---|---|---|---|---|---|---|
| A | 10-1-CC (polyglyceryl-10-caprylate/caprate) | 5 | 5 | 5 | 5 | 5 | 5 | — |
| | Polyglyceryl-3 stearate | 1.5 | 1.5 | 2 | 1 | — | — | — |
| | Polyglyceryl-4 stearate | — | — | — | — | 1.5 | — | — |
| | Glycerol monostearate | — | 0.5 | 0.5 | — | 0.5 | — | — |
| | Tween 20 | — | — | — | — | — | — | 2.5 |
| | Glycerol | 81.5 | 81 | 80.5 | 81.5 | 81.5 | 83 | 85.5 |
| B | Refined olive oil | 10 | 10 | 10 | 10 | 10 | 10 | 10 |
| C | Deionized water | 2 | 2 | 2 | 2 | 2 | 2 | 2 |
| | Total | To 100 | | | | | | |

Note:
The amounts of the various substances in Table 7 are mass percentages.

Test 4: Survey on Stability

Thermal aging test: Samples were placed in a thermostat for heat resisting test (40° C. or 48° C. for three months), a thermostat for cold resisting test (−18° C. for one month, or 4° C. for three months), and a thermostat for cold/heat cycling test (−18° C. to 40° C. for 10 cycles, 24 hours per cycle) to see whether the materials had any change in state (e.g., stratification, water bleeding, inhomogeneity, etc). In the case of no change at a temperature, the result was indicated with ○; otherwise, the result was indicated with Δ.

Centrifugal test: The samples were centrifuged at 2000 rpm for 30 min to see whether stratification occurred, and other indicators for the evaluation included changes in color, fragrance, appearance, transparency, etc. In the case of no change before and after centrifugation, the result was indicated with ○; otherwise, the result was indicated with Δ.

The results are shown in Table 8.

TABLE 8

| Example | Heat Resisting Test | | Cold Resisting Test | | Cold-heat Cycling Test −18° C. | Centrifugal |
|---|---|---|---|---|---|---|
| | 40° C. | 48° C. | −18° C. | 4° C. | to 40° C. | Test |
| 15 | Δ | Δ | Δ | Δ | Δ | Δ |
| 16 | Δ | Δ | Δ | Δ | Δ | Δ |
| 17 | Δ | Δ | Δ | Δ | Δ | Δ |
| 18 | Δ | Δ | Δ | Δ | Δ | Δ |
| 19 | Δ | Δ | Δ | Δ | Δ | Δ |
| 20 | Δ | Δ | Δ | Δ | Δ | Δ |
| 21 | ○ | ○ | ○ | ○ | ○ | ○ |

As shown by the results, except for Tween 20 as well as sucrose laurate and polyglycerol monolaurate used in the preceding Examples, the other surfactants such as polyglyceryl-10-caprylate/caprate, polyglyceryl-3 stearate and the like cannot sustain the structure of the system, and the stability is problematic.

Of course, it's also possible that this phenomenon has something to do with the amount and/or type of the oil and/or fat. Hence, high HLB surfactants such as polyglycerols, sucrose esters, polysorbates can be used in this system.

Test 5: Evaluation on Cleansing Power

Evaluation method: Milk residue is determined according to COD (chemical oxygen demand) method.

Samples: deionized water, Pigeon detergent for milk bottles, and the sample prepared according to Example 8 in the present disclosure I. Preparatory Work Formulation of milk: 40 g milk powder (Aptamil, stage IV) was dissolved in 200 g water at 50° C.

Formulation of detergents: The Pigeon detergent for milk bottles and the sample from Example 8 in the present disclosure were diluted respectively at 1:1 with deionized water. That is, 10 g detergent was mixed into 10 g deionized water.

II. Pretreatment of Milk Residue Specimens 2 g milk was loaded into each of six 5 ml PET plastic bottles, and the bottles were shaken up and down sufficiently. The bottles were allowed to stand still for 5 min; the milk was dumped from the bottles; and the bottles were allowed to stand up side down for 5 min. Then, the bottles were allowed to stand open and upright overnight. 3 g of a detergent was placed into a bottle. The bottle was shaken up and down, and then allowed to stand still for 10 min. The detergent was dumped from the bottle, and the bottle was allowed to stand up side down for 5 min.

Two 5 ml PET bottles as treated above each were loaded and washed with 3 g deionized water and shaken up and down sufficiently. Then, the washing liquid was dumped. The above operation was repeated three times. At the end, 3 g deionized water was added, followed by ultrasonication for 10 min. The resulting liquid specimen was put aside for further testing.

Another two 5 ml PET bottles as treated above each were loaded and washed with 3 g Pigeon detergent for milk bottles, and shaken up and down sufficiently. Then, the washing liquid was dumped. The above operation was repeated three times. At the end, 3 g deionized water was added, followed by ultrasonication for 10 min. The resulting liquid specimen was put aside for further testing.

The last two 5 ml PET bottles as treated above each were loaded and washed with 3 g of the sample detergent from Example 8 in the present disclosure, and shaken up and down sufficiently. Then, the washing liquid was dumped. The above operation was repeated three times. At the end, 3 g deionized water was added, followed by ultrasonication for 10 min. The resulting liquid specimen was put aside for further testing.

Test 2 ml of each of the above liquid specimens to be tested was measured and put in a Hach low-range COD digestion reagent vial which was then capped and shaken up. Meanwhile, 2 ml deionized water was measured and put in a Hach low-range COD digestion reagent vial which was then capped and shaken up. It was used as a specimen for zero calibration of the instrument.

A Hach DBR200 reactor was started and preheated to 150° C. Each of the digestion vials containing the specimens was placed in the reactor and heated for 2 h, and then cooled to room temperature.

A Hach DR900 multipurpose spectrophotometer was started, and Program 430LR was chosen. The spectrophotometer was subjected to zero calibration using the specimen for zero calibration of the instrument. Then, the above 6 milk residue specimens were tested, and readings were recorded.

Note: This method is suitable for testing specimens having a COD value in the range of 3-150 mg/L. If the reading is higher than 150 mg/L, the instrument will give a warning about outrange.

The results are shown in Table 9.

TABLE 9

| Sample Name | Washing Number | COD(mg/L) | Note |
|---|---|---|---|
| Deionized water | First time | >150 | Exceeding the upper limit of the measuring range; exhibiting an obvious green color |
| | Second time | 91 | |
| Pigeon detergent for milk bottles | First time | >150 | Exceeding the upper limit of the measuring range; exhibiting an obvious green color |
| | Second time | >150 | Exceeding the upper limit of the measuring range; exhibiting an obvious green color |
| Sample from Example 8 | First time | 42 | |
| | Second time | 85 | |

As shown by the results, the chemical oxygen demand (COD) values obtained after washing with the cleaning composition formulation of the present disclosure are lower than those obtained with the comparative product and water, indicating that the present disclosure provides the minimum total residues of milk stain+detergent.

What is claimed is:

1. A method of cleaning a hard surface, comprising:

a) providing a composition comprising:

i) an oil and/or fat, wherein the oil and/or fat is from 1% to 20% by weight based on a total weight of the composition;

ii) a polyol, wherein the polyol comprises glycerol;

iii) a surfactant, wherein the surfactant comprises polyglycerol monolaurates, sucrose laurates, polysorbate, or any combination thereof; and iv) water, wherein the water is equal to or less than 5 wt % based on the total weight of the composition, wherein a weight ratio of the surfactant to the oil and/or fat is equal to or greater than 1:5; and b) contacting the composition with the hard surface.

2. The method of claim 1, wherein the hard surface has a surface energy of less than 72.2 $mJ/m^2$.

3. The method of claim 1, wherein the hard surface comprises surfaces of a food processing facility, a food/drink transport facility, a child care facility, an infant dinnerware, a milk bottle, and a nipple.

4. The method of claim 1, wherein the hard surface has a surface energy in the range of 12.4 $mJ/m^2$ to 61 $mJ/m^2$.

5. The method of claim 1, wherein the surfactant is from 0.5% to 5% by weight based on the total weight of the composition.

6. The method of claim 1, wherein the composition comprises:

a) the oil and/or fat in an amount of 5% to 10 wt % based on the total weight of the composition;

b) glycerol;

c) the surfactant in an amount of 1% to 5 wt % based on the total weight of the composition; and d) water in an amount of 0% to 2 wt % based on the total weight of the composition.

* * * * *